March 30, 1965  H. D. TEXTOR  3,175,890
APPARATUS FOR THE GENERATION OF CARBON MONOXIDE GAS
Original Filed Nov. 13, 1957
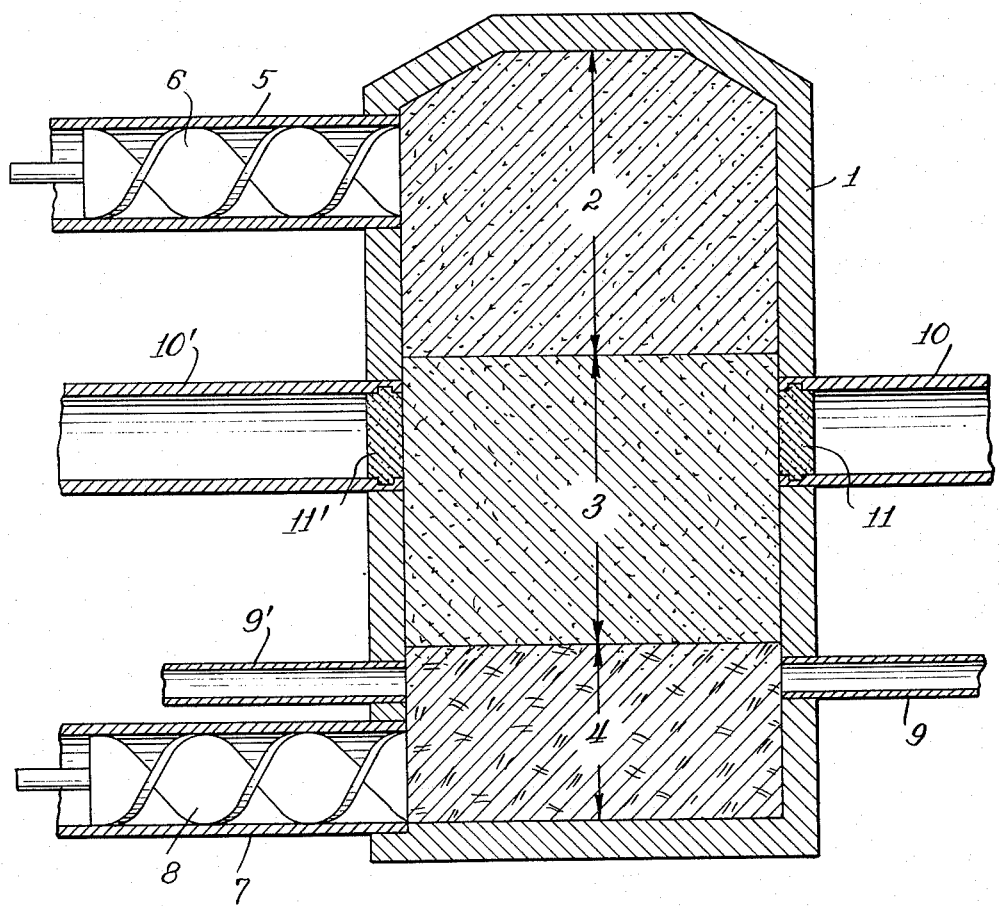
INVENTOR.
Hans-Dieter Textor
BY
Jones, Darby & Robertson
Att'ys.

3,175,890
APPARATUS FOR THE GENERATION OF CARBON MONOXIDE GAS

Hans D. Textor, Hausloh, Stolberg, Rhineland, Germany, assignor to Ferdinand Lentjes, Dusseldorf-Oberkassel, Germany
Original application Nov. 13, 1957, Ser. No. 696,182. Divided and this application Mar. 20, 1961, Ser. No. 105,840
5 Claims. (Cl. 23—281)

This application is a division of Serial Number 696,182, filed November 13, 1957, now abandoned, method claims of which are found in Patent No. 3,066,019, patented November 27, 1962.

This invention relates to apparatus in which a process for producing carbon monoxide gas may be carried out.

Carbon monoxide gas is commonly produced by passing air over a live coke bed to produce a gaseous combustion product consisting substantially of carbon dioxide gas. This gaseous product is then conducted through a reduction zone filled with unfired coke where the carbon dioxide is reduced to form carbon monoxide. Generators of this type usually operate at a processing rate of 500 to 1,000 kilograms per square meter per hour. It is necessary that coke of a relatively large granular size be used. Although this process is being used commercially, it has several disadvantages. Because the process consists of two separate steps, additional equipment must be used. Since large granular size coke is required, the raw material cost is high. Additionally, the flow rate through the generator must be limited by the relatively slow reaction rates within the generator, necessitating the use of large equipment.

It is an object of the invention claimed in Patent No. 3,066,019 to provide a one-step method for the production of CO gas from a carbonaceous starting material.

It is a further object to provide a process in which a relatively inexpensive starting material such as fine granular coal may be used.

It is a further object to provide a process for the production of a carbon monoxide gas mixture having an enhanced calorific value.

It is still further an object to provide an apparatus for carrying out a one-step process for producing carbon monoxide gas.

Other objects and advantages of the invention will become more apparent from a study of the specification and drawing.

It has been found that carbon monoxide gas may be produced in one step by passing an oxygen-containing gas such as air through a densely packed granular incandescent carbonaceous bed at a high velocity, and removing the carbon monoxide so formed from the reaction zone before it can be further oxidized. The gas is formed in excellent yield and with a high reaction efficiency. It has further been found that if water in the form of steam is added to the influent gas, it will be decomposed in the reaction zone, with the result that the product gas emerging from the generator will be enriched with hydrogen and will have an enhanced calorific value.

The single figure of the drawing illustrates a schematic diagram of a generator for producing a gaseous product according to the present invention.

The generator comprises an enclosure 1, the interior of which is divided into three zones, a charging zone 2, a central reaction zone 3, and a discharge zone 4. A coal intake duct 5 is connected to the charging zone 2. Inside the duct 5 is mounted a screw conveyor. Air intake ducts 9 and 9' and a slag discharge duct 7 are connected to the discharge zone. The slag discharge duct has mounted therein a screw conveyor 8. Two gas discharge ducts 10 and 10' are connected to the reaction zone. Covering the mouth of each of the ducts 10 and 10' is a porous metal screening disk.

In operation granulated coal dust having a size less than 10 millimeters is fed through the intake duct 5 into the charging zone 2. The granular coal is forced into the charging zone with sufficient force to produce a packed bed having a high density. The coal is ignited in the reaction zone and maintained in an incandescent state. Air is fed into the generator through air intake ducts 9 and 9', the air passing through the reaction zone bed at a high velocity and oxidizing the carbon contained in the coal to carbon monoxide. Because of the high velocity of the gas flow, the carbon monoxide so produced is forced out of the reaction zone through discharge tubes 10 and 10' before it can be further oxidized to carbon dioxide. In order to prevent the coal from being forced out of the generator with the gaseous product, the mechanical screening means 11 and 11' are affixed to the mouths of the discharge tubes. They are preferably composed of a porous, heat-resistant material. Among the types which may be used are fine-meshed wire cloth, ceramic grids, and porous metal plates. The non-gaseous products of the reaction form a slag which settles to the bottom of the generator and is carried off by discharge duct 7. The granular coal is continuously fed to the charging zone at a rate sufficient to keep the combustion reaction within the reaction zone, and with a sufficient force to maintain a densely packed bed in the generator.

In order that the process may be maintained at a high efficiency, the flow velocity of the air through the incandescent bed should be from about 100 to about 500 meters per second. This allows 2 to 5 tons of gas to be processed per square meter of grate area per hour. The resulting carbon monoxide gas product will have a calorific value of approximately 900 kilogram-calories per standard cubic meter.

The process of the invention may be further improved to yield a product gas having an even higher calorific value if steam in an amount of about 20 to 40 percent is added to the influent air. As the steam passes through the reaction zone it decomposes to yield hydrogen which is added to the product gas. By thus adding steam it is possible to obtain a product gas having a calorific value of approximately 1200 kilogram-calories per standard cubic meter.

The present process has several advantages over the prior art processes. It is a one-step process, eliminating the need for the additional apparatus necessary for carrying out the traditional second-step reduction. The generator may have small dimensions while still producing a high output, since the reactant gas is introduced and the product gas withdrawn at very high velocities. An additional advantage is that inexpensive material such as granular coal, coal or coke dust, and even flue coal, a material which has generally been considered as low-grade, may be used without any difficulty.

Invention is claimed as follows:

1. A generator for the production of carbon monoxide gas comprising a closed chamber having an upper charging zone, a central reaction zone, and a lower discharge zone, an intake duct having a force-feed means being connected to said charging zone and adapted to introduce solid carbonaceous reactive material into said charging zone with sufficient force to maintain in the reaction zone a compacted bed of said material, a gas discharge duct being connected to said central reaction zone, an air intake duct being connected to the upper portion of said discharge zone, and a slag discharge duct having a conveyor means being connected to said discharge zone, and said gas discharge duct being provided with a heat resistant porous mechanical screening means substantially at the entrance to the gas discharge duct for preventing the particles of said bed from leaving the chamber by entering the gas discharge duct, said screening means being sufficiently fine and having sufficient strength in a transverse direction to retain the particles of the bed in said chamber against the compacting pressure of the force-feed means.

2. A generator for the production of carbon monoxide gas comprising a closed chamber having an upper charging zone, a central reaction zone, and a lower discharge zone, an intake duct having a force-feed means being connected to said charging zone and adapted to introduce solid carbonaceous reactive material, of a size less than 10 millimeters, into said charging zone with sufficient force to maintain in the reaction zone a compacted bed of said material, a gas discharge duct being connected to said central reaction zone, an air intake duct being connected to the upper portion of said discharge zone, and a slag discharge duct having a conveyor means being connected to said discharge zone, and said gas discharge duct being provided with a heat resistant porous mechanical screening means substantially at the entrance to the gas discharge duct for preventing the particles of said bed, of a size less than 10 millimeters, from leaving the chamber by entering the gas discharge duct, said screening means being sufficiently fine and having sufficient strength in a transverse direction to retain the particles of the bed in said chamber against the compacting pressure of the force-feed means.

3. A generator for the production of carbon monoxide gas comprising a closed chamber having an upper charging zone, a central reaction zone, and a lower discharge zone, an intake duct having a force-feed means being connected to said charging zone and adapted to introduce solid carbonaceous reactive material into said charging zone with sufficient force to maintain in the reaction zone a compacted bed of said material, gas discharge and intake ducts communicating with the chamber at points located to cause a gaseous flow through the reaction zone, and a slag discharge duct having a conveyor means being connected to said discharge zone and said gas discharge duct being provided with a heat resistant porous mechanical screening means substantially at the entrance to the gas discharge duct for preventing the particles of said bed from leaving the chamber by entering the gas discharge duct, said screening means being sufficiently fine and having sufficient strength in a transverse direction to retain the particles of the bed in said chamber against the compacting pressure of the force-feed means.

4. A generator for the production of carbon monoxide gas comprising a closed chamber having an upper charging zone, a central reaction zone, and a lower discharge zone, an intake duct having a force-feed means being connected to said charging zone and adapted to introduce solid carbonaceous reactive material into said charging zone with sufficient force to maintain in the reaction zone a compacted bed of said material, means for causing air to flow through the bed at a speed of about 100 to 500 meters per second, including gas discharge and intake ducts communicating with the chamber at points located to cause a gaseous flow through the reaction zone, and a slag discharge duct having a conveyor means being connected to said discharge zone, and said gas discharge duct being provided with a heat resistant porous mechanical screening means substantially at the entrance to the gas discharge duct for preventing the particles of said bed from leaving the chamber by entering the gas discharge duct, said screening means being sufficiently fine and having sufficient strength in a transverse direction to retain the particles of the bed in said chamber against the compacting pressure of the force-feed means.

5. A generator for the production of carbon monoxide gas comprising a closed chamber having an upper charging zone, a central reaction zone, and a lower discharge zone, an intake duct having a force-feed means being connected to said charging zone and adapted to introduce solid carbonaceous reactive material, of a size less than 10 millimeters, into said charging zone with sufficient force to maintain in the reaction zone a compacted bed of said material, means for causing air to flow through the bed at a speed of about 100 to 500 meters per second, including gas discharge and intake ducts communicating with the chamber at points located to cause a gaseous flow through the reaction zone, the discharge duct being connected to the central recation zone to remove carbon monoxide from the bed before it is further oxidized, and a slag discharge duct having a conveyor means being connected to said discharge zone, and said gas discharge duct being provided with a heat resistant porous mechanical screening means substantially at the entrance to the gas discharge duct for preventing the particles of said bed, of a size less than 10 millimeters, from leaving the chamber by entering the gas discharge duct, said screening means being sufficiently fine and having sufficient strength in a transverse direction to retain the particles of the bed in said chamber against the compacting pressure of the force-feed means.

References Cited by the Examiner
UNITED STATES PATENTS 2,631,930  3/53  Peters _____ 48—76 X MORRIS O. WOLK, *Primary Examiner.*

JAMES H. TAYMAN, *Examiner.*